Sept. 22, 1959     I. W. EISENBERG ET AL     2,905,776
ELECTRICAL CONTROL UNIT
Filed Jan. 16, 1956     5 Sheets-Sheet 1
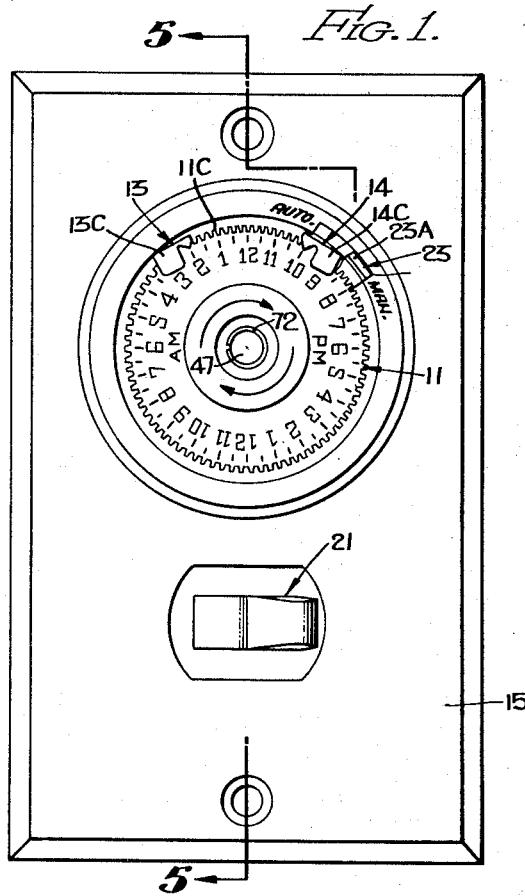
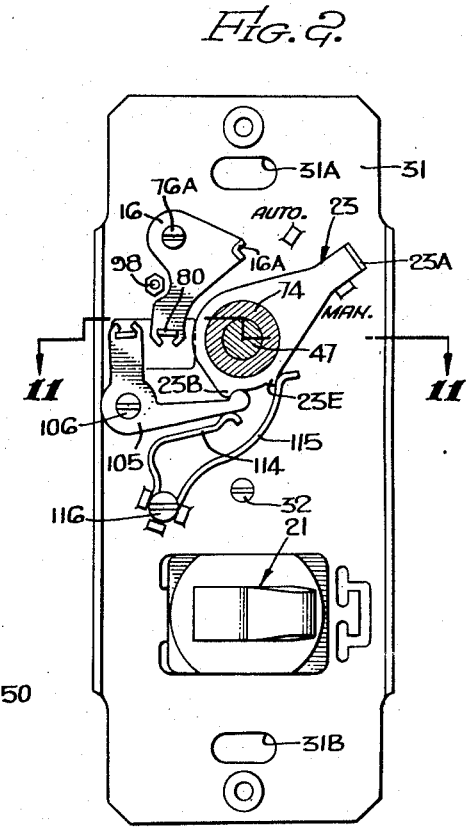
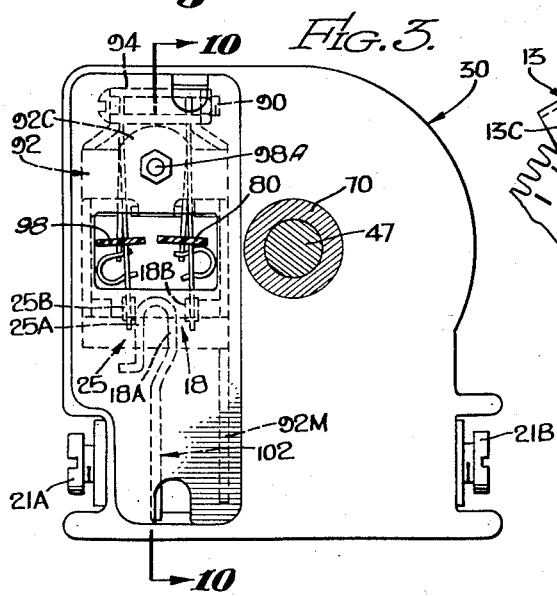
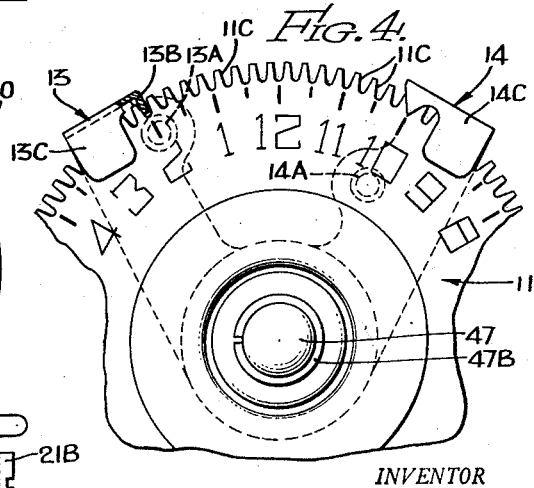
INVENTOR
BY Lyon & Lyon
ATTORNEYS

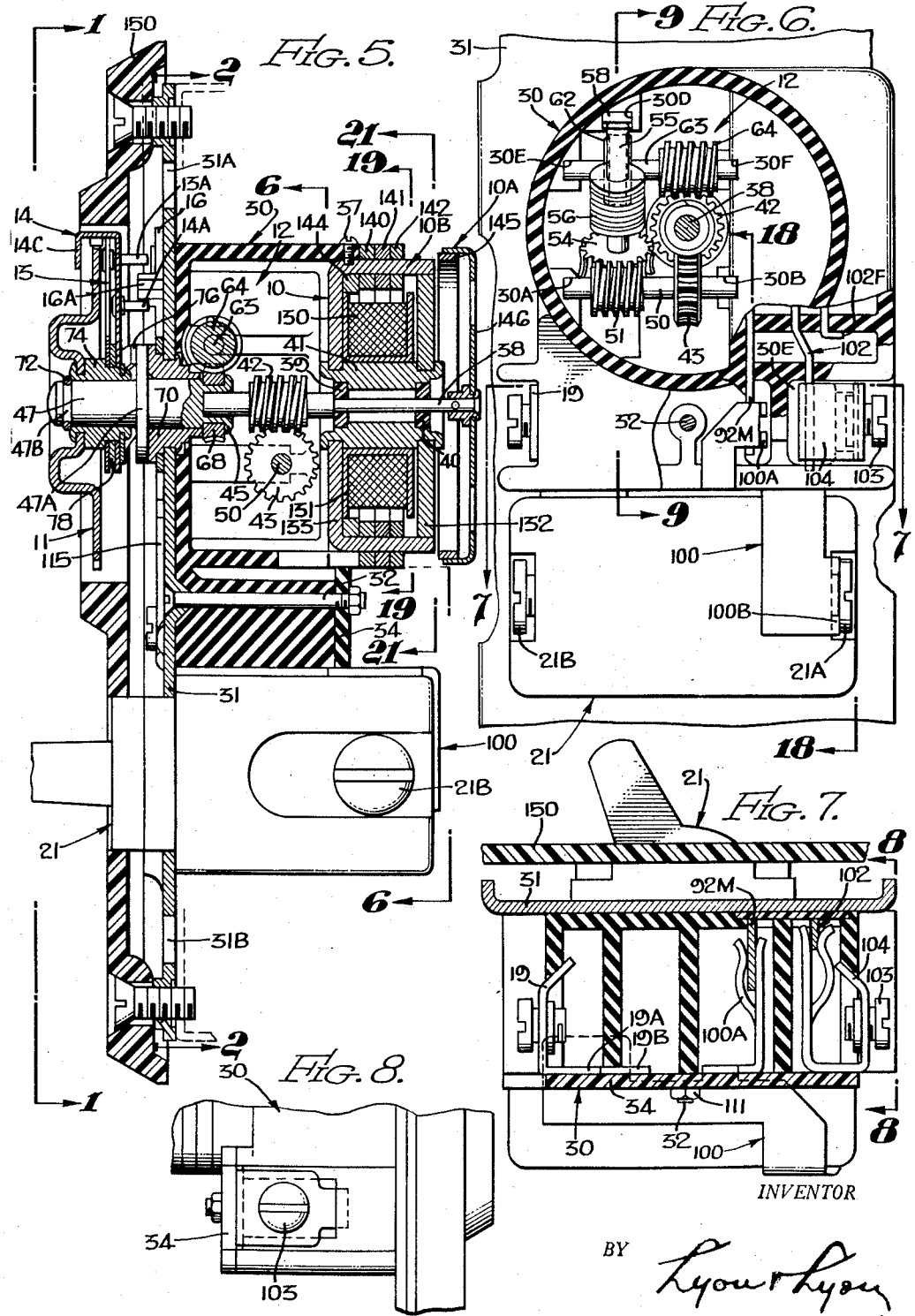

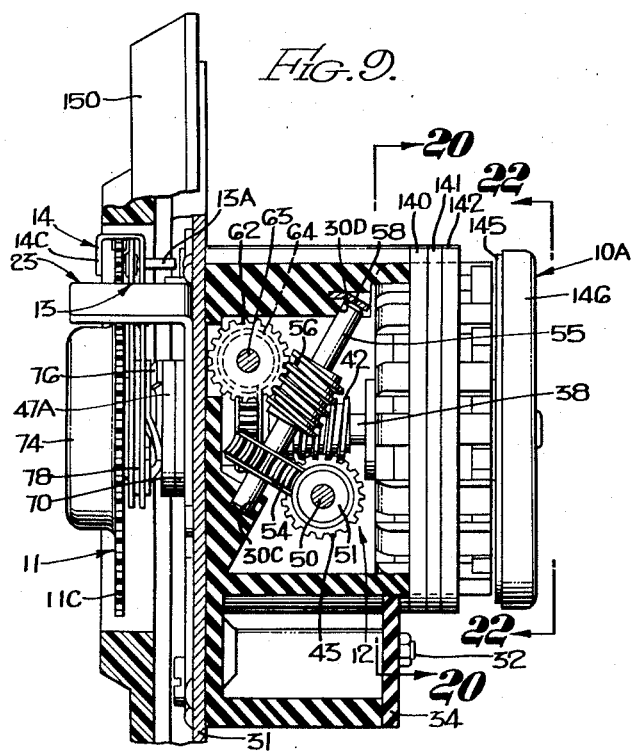
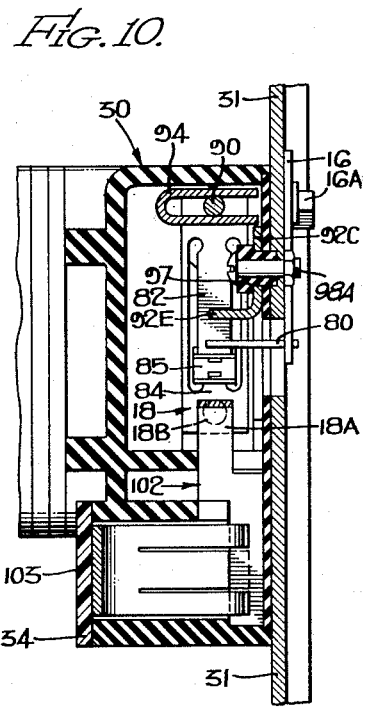
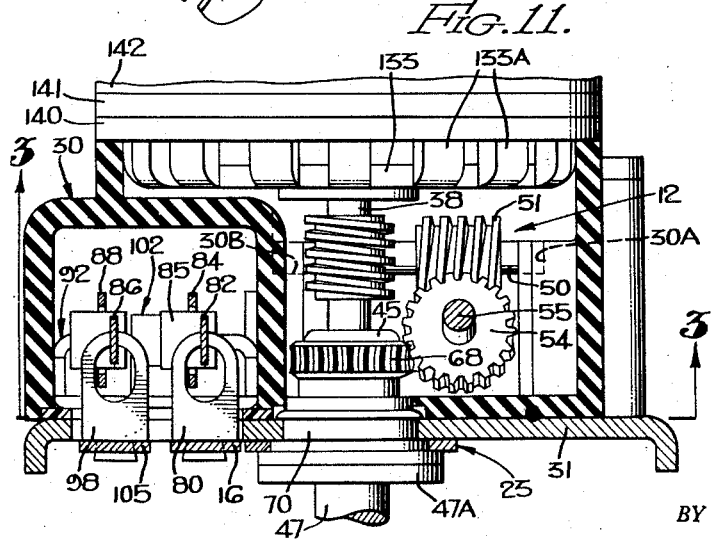
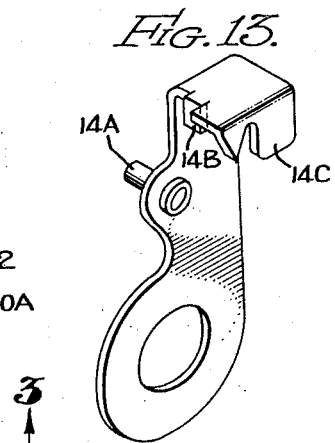

Sept. 22, 1959     I. W. EISENBERG ET AL     2,905,776
ELECTRICAL CONTROL UNIT
Filed Jan. 16, 1956                                5 Sheets-Sheet 4
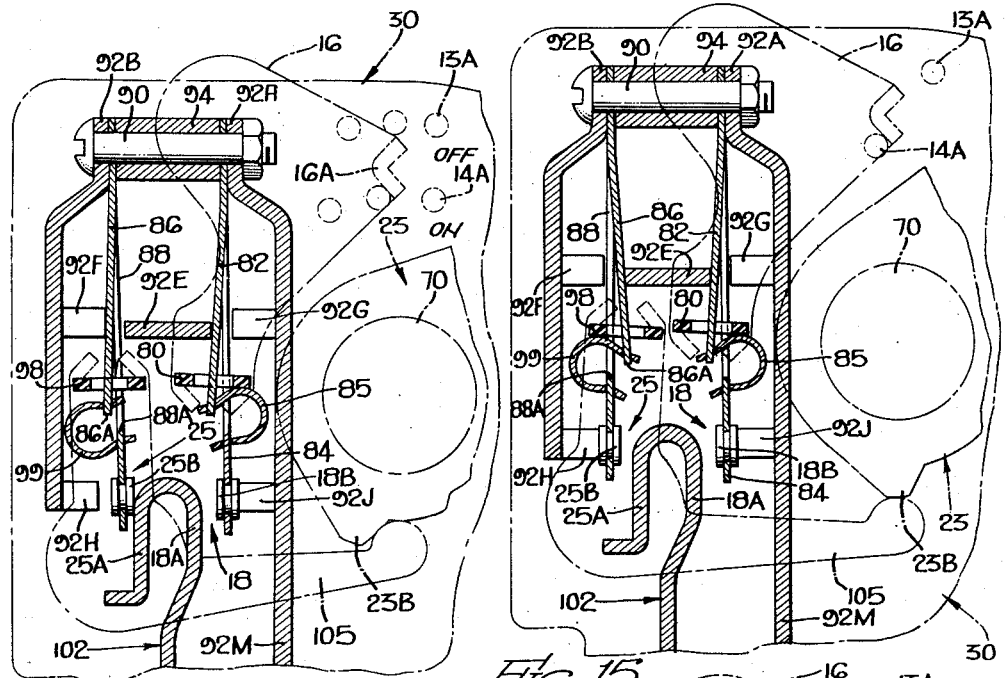
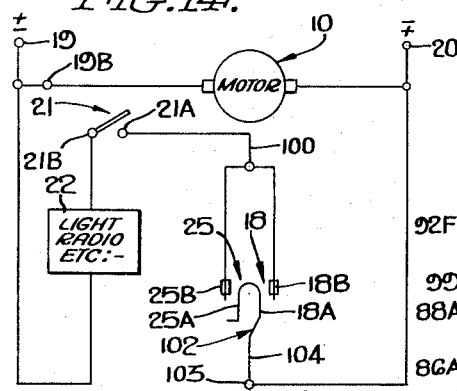
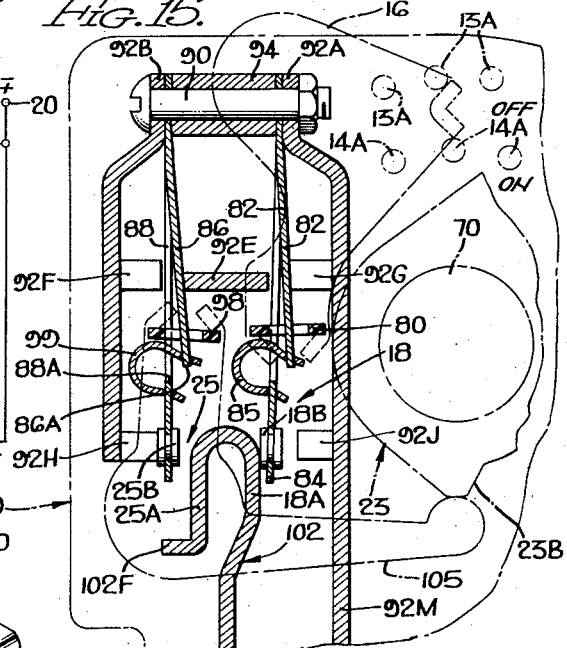
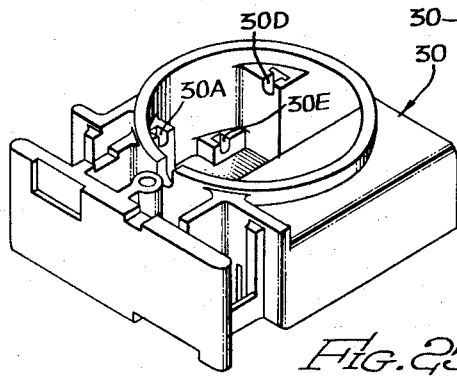
INVENTOR
BY *Lyon+Lyon*
ATTORNEYS

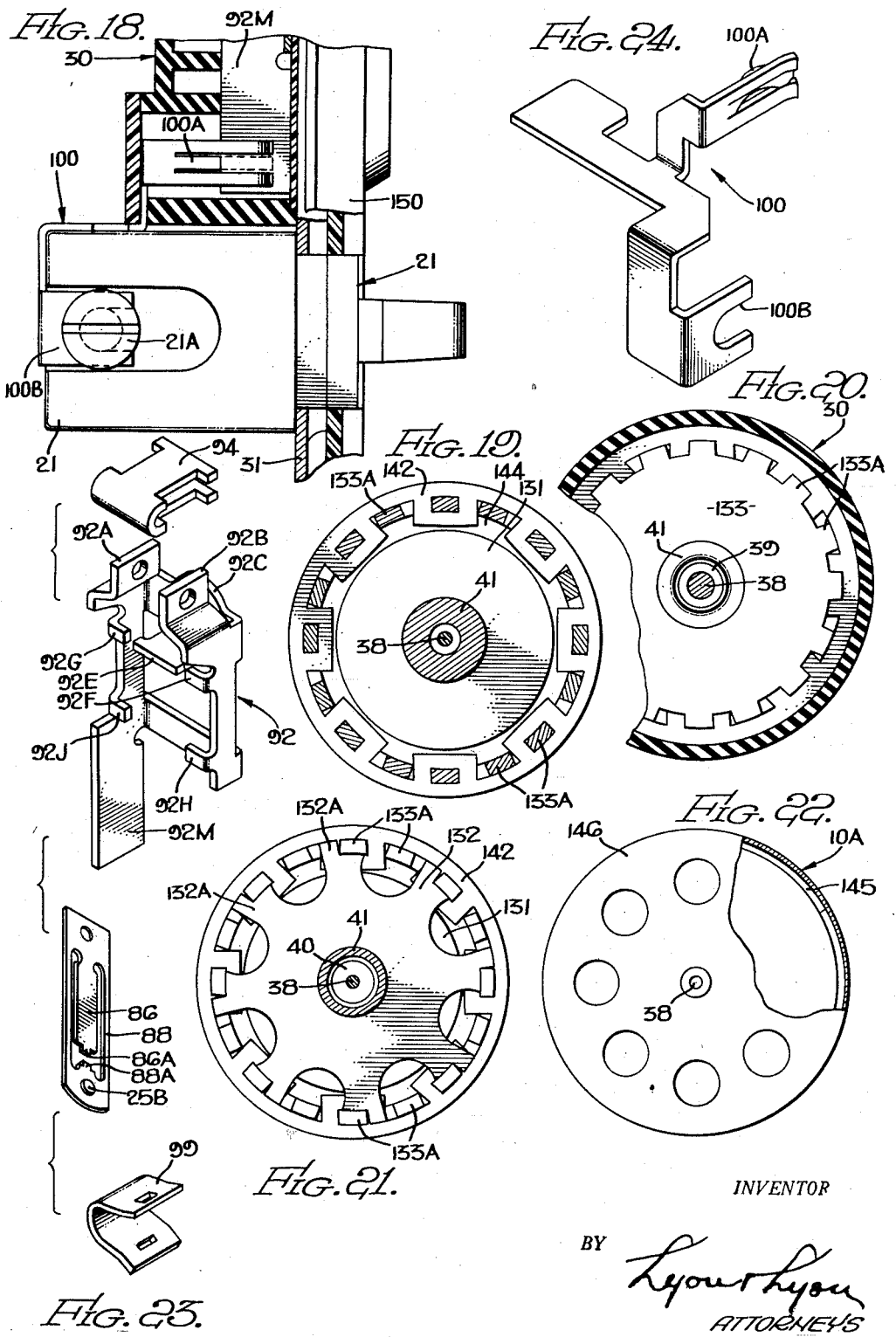

United States Patent Office 2,905,776
Patented Sept. 22, 1959

2,905,776

ELECTRICAL CONTROL UNIT

Irwin W. Eisenberg and Clarence H. Dibble, Pasadena, Lee Burdell Armstrong, Rosemead, Kenneth Timothy Alfred Love, Azusa, and Chester Ray Rhodes, Whittier, Calif., assignors to Phaostron Instrument and Electronic Company, South Pasadena, Calif., a corporation of California Application January 16, 1956, Serial No. 559,411

7 Claims. (Cl. 200—37)

The present invention relates to improved timing mechanism adapted to open and close electrical circuits at predetermined times during a predetermined period of time, for example, each twenty-four hour day with the cycle being repeated each day, if desired.

The timing mechanism described herein is adaptable to a wide variety of uses, and the invention is described incorporated in a unit for controlling electrical apparatus such as radio receivers, motors or other electrically operated devices so as to energize and deenergize the same at predetermined times. These uses specifically mentioned are merely exemplary of other uses which may suggest themselves.

An object of the present invention is to provide a relatively simple and compact unit incorporating a clock motor, reduction gearing and switches which are operated at different preset times in accordance with adjustment of actuating members carried on a member case rotated by clock motor.

Another object of the present invention is to provide an improved unit of this type which may be mounted in a receptacle which corresponds to receptacles used in present day practice for housing a wall type toggle switch in residences.

Another object of the present invention is to provide a compact unit as mentioned above, which incorporates an on-off switch as well as a manually operable mechanism which may be adjusted to provide either the desired automatic operation or, if desired, a so-called manual operation of the type wherein the controlling circuit may be selectively closed regardless of the time of day, i.e., regardless of the position of the clock motor operated mechanism.

Another object of the present invention is to provide a unit of this type which is relatively simple and the parts of which may be manufactured and assembled with relative ease and small expense using present day techniques.

Another object of the present invention is to provide a unit of this type which is efficient and reliable in operation over long periods of time without requiring attention and one which can be very easily and quickly adjusted to achieve any desired timing cycles.

Another object of the present invention is to provide a unit of this type in which the controlling switches are relatively simple and operated with a snap action to thereby prolong contact life and to permit control of relatively large currents.

Another object of the present invention is to provide a unit of this type incorporating manually operable means which permit manual operation of a switch into either closed or open position at any desired time without altering any previously preset automatic sequence of switch operation.

The features of the present invention which are believed to be novel are set forth with particularity in the appended claims. This invention itself, both as its organization and manner of operation, together with further objects and advantages thereof, may be best understood by reference to the following description taken in connection with the accompanying drawings, in which:

Figure 1 is a view in front elevation of a unit embodying features of the present invention and is a view taken in the direction indicated by the line 1—1 in Figure 5;

Figure 2 is a sectional view taken on line 2—2 of Figure 5;

Figure 3 is a sectional view taken on line 3—3 of Figure 11;

Figure 4 shows, in enlarged form, a portion of the dial and manually preset switch actuating members shown in Figure 1;

Figure 5 is a sectional view taken on line 5—5 of Figure 1;

Figure 6 is a sectional view taken on the line 6—6 of Figure 5;

Figure 7 is a sectional view taken on the line 7—7 of Figure 6;

Figure 8 is a view taken generally on the line 8—8 of Figure 7;

Figure 9 is a sectional view taken on the line 9—9 of Figure 6;

Figure 10 is a sectional view taken on the line 10—10 of Figure 3;

Figure 11 is a sectional view taken on the line 11—11 of Figure 2;

Figure 12 is a perspective view of a resilient clutch element incorporated in the unit shown in Figure 1;

Figure 13 is a perspective view of one of the manually operable presetting elements illustrated in Figures 1 and 4;

Figures 14, 15 and 16 are views showing the controlling switches in various operating positions, Figure 14 showing one of the switches in the so-called manual position, and Figures 15 and 16 showing the switches they may assume during so-called automatic operation;

Figure 17 is a simplified wiring diagram of the unit unit illustrated in Figure 1 in conjunction with electrical apparatus which is controlled thereby;

Figure 18 is a sectional view taken substantially on the line 18—18 of Figure 6;

Figure 19 is a sectional view on the line 19—19 of Figure 5;

Figure 20 is a sectional view taken on the line 20—20 of Figure 9;

Figure 21 is a sectional view taken on the line 21—21 of Figure 5;

Figure 22 is a view taken generally in the direction indicated by the line 22—22 in Figure 9, with, however, a portion of the structure broken away;

Figure 23 is an exploded view showing in perspective various elements comprising one of the switches illustrated in Figures 14, 15 and 16;

Figure 24 is a perspective view of an electrical connecting element and mechanical supporting element incorporated in the unit shown in Figure 1; and Figure 25 is a perspective view of the casing used in the unit.

Briefly, the unit includes a synchronous clock motor 10 which drives the dial 11 at the rate of one revolution per twenty-four hours through a gear reduction unit 12. The gear reduction unit 12 comprises four pairs of worms and associated worm gear combinations arranged in a compact manner to achieve features of the present invention. The dial 11 has a serrated circular edge with each serration corresponding to a fifteen minute interval. A pair of manually adjustable levers 13 and 14 are rotatably mounted about the rotational axis of the dial 11 and are releasably engageable with any one of the desired serrations. Each of these levers 13 and 14 carry a pin 13A and 14A, respectively (Figure 4), which are movable into engagement with a pivot switch actuating plate 16 (Figures 15 and 16) for operating the snap switch 18 having the fixed contact 18A and movable contact 18B to "on" and "off" positions, respectively. This switch 18 is wired, as shown in Figure 17, in a series circuit which includes: terminal 20, switch 18, a main "on" and "off" switch 21, the electrical apparatus 22 to be controlled and the terminal 19. The motor 10 is connected between such terminals 19 and 20. The main on-off switch 21 is a commercial type of toggle switch which is mounted in the unit as described herein. By presetting the aforementioned levers 13 and 14 the electrical apparatus 22 may be energized any predetermined time during the day and deenergized during any time of the day.

The unit includes another manually operable lever, namely, the lever 23 (Figure 1) for obtaining so-called manual or automatic operation and for accomplishing this function the lever 23 has two positions, an automatic position and a manual position. In the manual position of lever 23, as illustrated in Figures 1 and 2 and described in connection with Figure 14, the lever 23 is in a position to allow the switch 25 to be closed, such switch 25 comprising the stationary contact 25A and the movable contact 25B, also illustrated in Figure 14. With switch 25 thus closed, switch 18 is short-circuited and the electrical apparatus 22 is energized (assuming switch 21 to be closed), regardless of the open or closed condition of switch 18. In the automatic position of lever 23, corresponding to an open condition of switch 25, the electrical apparatus 22 is energized or deenergized automatically in accordance with operation of switch 18.

For accomplishing these general purposes, the structure now set forth in greater detail is provided.

The unit includes a specially moulded body of insulating material referred to as the insulating casing 30 which is mounted on a mounting plate 31 (Figure 5) by a mounting bolt 32 which passes through an aperture portion of plate 31, aperture portion of the casing 30 and the insulating plate 34.

The mounting plate 31 is generally rectangular having dimensions which are generally somewhat smaller than the internal dimensions of a conventional metallic junction box used to house the conventional type of wall toggle switch used generally in residences. The mounting plate 31 is provided with aperture portions 31A and 31B (Figure 5) so that the same with the unit mounted thereon may be completely housed within such conventional junction box with of course the dial 11 and on-off switch 21 being visible and accessible.

The casing 30 thus releasably secured to the mounting plate 31 has an upper (Figure 5) hollow portion in the form of an open ended tube for housing the gear reduction train 12 and for supporting the motor 10. The motor 10 is fitted into the open end of such tubular portion and may be secured therein by conventional means such as a bayonet type of connection and exemplified herein in the form of a set screw 37.

The motor 10 may be of conventional construction and includes generally a field structure 10B which is stationarily mounted on the casing 30 and a rotatable armature 10A.

The specific form of motor shown in the drawings is described in detail hereinafter. The armature 10A in the form of a ring is mounted on the rotatable shaft 38 which is journalled for rotation in the spaced bearing members 39 and 40 in the core 41. The shaft 38 is prolonged and has integrally formed therewith the worm 42 which cooperates with the worm gear 43, the extended end of such shaft 38 being journalled for rotation also in the bearing 45.

This spindle 47 is continuously rotated by the motor shaft 38 at, of course, a greatly reduced speed through a gear reduction train comprising four pairs of worms and cooperating worm gears, one of which being the aforesaid worm 42 and the worm gear 43.

The worm gear 43, as shown in Figures 5 and 6, is mounted on the shaft 50 which also mounts the worm 51, said shaft 50 being slideably received and journalled for rotation in grooves 30A and 30B, formed in the molded casing 30. This worm 51 is in mesh with the cooperating worm gear 54 mounted on shaft 55 which also mounts the worm 56, the shaft 55 having its opposite ends similarly slideably received in grooves 30D and 30C (Figure 9) within which such shaft is journalled for rotation. In this case, however, the groove portion 30D has inserted therein a metal plate 58 contacting one end of the shaft 55 to accommodate thrust forces.

The worm 56 is in mesh with the worm gear 62 on shaft 63 which has the worm 64 also mounted thereon. The shaft 63 in similar manner is slideably received and journalled for rotation at its opposite ends in the preformed grooves 30E and 30F in the casing 30. The worm 64 (Figures 5 and 6) is in mesh with the worm gear 68 on the spindle 47 for purposes of driving the same and the dial 11 carried thereon at a greatly reduced speed. It is noted that the three shafts 50, 55 and 63, each carrying a worm and a worm gear, may be fabricated with such worm and worm gear integral therewith. It is noted further that the axes of the shafts 63 and 50 are substantially parallel and extend in a generally perpendicular direction with respect to the axis of the shaft 38, while the axis of the shaft 55 (as shown in Figure 9) is inclined with respect to the axes of the other shafts 38, 50 and 63. This arrangement, using preformed grooves in the casing for receiving the ends of the various shafts and for rotatably supporting the same allows relatively quick, easy and inexpensive construction, both in parts and in the assembly operation.

The spindle 47 which mounts the worm gear 68 has its axis coextensive with the axis of shaft 38 and is journalled for rotation in the stationary bushing 70 which is mounted on the mounting plate 31. The spindle 47 has integrally formed therewith an annular flange member 47A engageable in sliding relationship with one face of the bushing 70. A snap ring 72 (Figure 5), mounted in a grooved portion 47B of the spindle, serves to retain an assembly which comprises a hub 74 and a bent spring friction disc 76 (Figures 5 and 12) against the flanged portion 47A. This particular assembly allows the dial 11 to be rotated about the axis of the spindle 47, if and when desired, so that the readings on the dial 11 (Figure 1) may correspond to the time of the day in the original installation at the time the driving motor is energized. This adjustment is accomplished simply by an operator turning the disc 11 the required angular distance. After this adjustment is accomplished, the pre-stressed spring washer 76 causes the dial 11 to be rotated with the shaft 47 in accordance with rotation of the motor shaft 38.

The aforementioned manually operable levers 13 and 14, of the character illustrated in Figure 13, are journalled for rotation on the hub 74 (Figure 5) with a spacer washer 78 interposed therebetween. By this construction the levers 13 and 14 may be independently rotated about the axis of the spindle 47.

These levers 13 and 14 are of slightly bendable sheet stock material and are each provided with a corresponding tongue 13B and 14B (Figures 4 and 13) engageable with any one of the serrated portions 11B (Figure 4) on the periphery of the dial. These tongues 13B and 14B normally lock the levers 13 and 14 with respect to the dial 11C so that these levers 13 and 14 normally rotate with the dial 11C. In order to change the relative position of the levers 13 and 14 on the dial, the operator, using his finger, engages the forwardly bent-over portions 13C and 14C, as the case may be, and presses the same inwardly to such an extent as to disengage the tongues 13B and 14B from the serration in which it happens to be and thereafter with the lever thus depressed, rotates the lever to the desired angular position, after which finger pressure is released, and in such case the tongue 13B or 14B, as the case may be, engages the desired serration which corresponds to the particular desired fifteen minute time interval.

As mentioned previously, these levers 13 and 14 carry pins 13A and 14A respectively, for actuating a pivotally mounted switch actuating plate 16 (Figures 14, 15, 16 and 2). The plate 16 is pivotally mounted about the axis of a post 76 in the form of a shouldered screw mounted on the mounting plate 31. This plate 16 is provided with an outwardly bent V-shaped portion 16A which is in the nature of a cam and which is positioned in the path of movement of the lever pins 13A and 14A so as to oscillate the plate 16 once each twenty-four hours.

The plate 16 of metal is provided with an insert of insulating material 80 in its bifurcated end for engagement with the cantilever supported flexible strip 82 for purposes of actuating the switch 18. This element 82 is connected to the free end of the switch arm 84 by a generally U-shaped bowed spring 85 so as to impart a snap action in the movement of the switch arm 84. These two cantiliver supported elements 82 and 84, as well as the cantiliver supported members 86 and 88, are mounted on the mounting plate 31 in a manner now described in detail with reference to Figures 23, 14 and 10.

These cantilever supported elements 82, 84, 86 and 88 are clamped together at their upper ends by a clamping bolt 90 which passes through apertured portions in these members, as well as the apertured ears 92A and 92B of the preformed metal conducting and supporting member 92 and the U-shaped spacer 94. The element 92 has an apertured ear 92C (Figures 23 and 10) for purposes of fastening to the mounting plate 31. For this purpose, an insulating bushing 97 is provided through which the fastening bolt 98A extends. As shown in Figure 23, the preformed element 92 is provided with an integrally formed central extension 92E and two side extensions 92F and 92G, serving as stop members for movement of the flexible cantilever supported members 82 and 86. It is noted that the insert 80 of insulating material is shaped so as to provide a good connection between the pivoted plate 16 and the arm 82 so as to obtain the desired snap action of the switch arm 84 to open and closed positions upon oscillation of the plate 16 in accordance with movement imparted thereto by the pins 13A and 14A.

It is noted also with reference to Figures 23 and 14 that the member 92 is provided with pair of inwardly projecting portions 92H and 92J for limiting movement of the contact 18B on the one hand, and movement of the contact 25B on the other hand.

Preferably, as shown in Figure 23, the arms 86 and 88 (similarly, arms 82 and 84) are integral, being formed from a single piece of sheet stock with each of the portions 86 and 88 having tongues 86A and 88A engageable in apertured portions in the generally U-shaped bowed spring element 99.

All of the elements shown in Figure 23 are of metal, i.e. conducting material, and serve as current conductors in addition to providing a partial mechanical support also for the conventional on-off switch 21. For this purpose, the element 92 has a downwardly extending leg 92M which is inserted in the spring metallic clamp 100A (Figure 24) which is in the form of a resilient tongue formed in the bent conducting and supporting strap 100. This strap 100 is provided at its lower end with a cut-out portion 100B which serves as a binding post and which is clamped by the conventional screw type binding post 21A (Figure 18) of the switch 21. This strap 100 corresponds to the lead 100 in Figure 17, and, correspondingly, the terminal 21A in Figure 17 corresponds to the binding post 21A in Figure 18.

The switch contacts 18A and 25A of switches 18 and 25 respectively are actual portions of the same bent conducting element 102 which has its upper end bent generally in the form of a U. This element 102 extends downwardly into a lower compartment 30E of the casing (Figures 6 and 7) where it is resiliently engaged by a spring clip terminal 104 which is snugly received within the compartment 30E and provided with the binding post 103. This spring clip 104 is of resilient sheet stock material and its resiliency is used to firmly maintain the same within the compartment 30E. This binding post 103 is represented as terminal 103 in Figure 17.

As indicated previously, the switch 25 (Figure 14) is operated by the manually operated lever 23 (Figures 1 and 2). The mechanism for producing such operation is now described in detail.

The lever 23 having an inturned and knurled end 23A is rotatably mounted on the outside of the stationary bushing 70 (Figure 5) and, as shown in Figure 14, is provided with a cam protuberance 23B for coaction with the pivot switch actuating arm 105. The arm 105 is pivoted about the post 106 in the form of a shouldered screw that is secured into the mounting plate 31. A pair of cantilever type springs 114 and 115 are provided, both being anchored on a common post 116 secured to the mounting plate 31. The spring 114 presses arm 105 into engagement with the cammed portion of the arm 23, while the other spring 115 cooperates with the protuberance 23E on arm 23 to maintain the arm 23 in either its manual or automatic positions. The upper bifurcated end of the lever 105 has an insert 98 of insulating material and is shaped as to provide a good connection with the arm 88. In the manual position of the arm 23, as shown in Figure 14, the switch 25 is closed, but in the automatic position of the arm 23 as shown in Figure 15 wherein the free end of the arm 105 is engaged with the outer end of the cam protuberance 23B being switch 25 in such case in its open position. The switches 18 and 25 (Figure 14) are both similar in construction and operation, but each is operated independently from the other.

In order to provide a binding post corresponding to the terminal 19 in Figure 17, a binding post having the identical number 19 is provided as shown in Figure 7. This binding post 19 has a leg 19A which is clamped between the casing 30 and the removable cover plate 34 by the nut 111. This cover plate 34 is removable for purposes of assembly to permit the element 92M to be attached to the element 100A and also so that the element 102 may be attached to the spring clip 104, as previously described. This leg 19A may terminate in soldering lug 19B for receiving a flexible lead of the motor 10, as indicated in Figure 17.

The device 22 which is controlled and which is indicated in Figure 14 is connected between the binding post 19 (Figure 7) and binding post 21B (Figure 6). The other lead of motor 10 may be connected to the terminal or binding post 103.

As indicated previously, the motor 10 may be of conventional construction but the one presently described in detail is preferred. The motor 10 includes coil 130 (Figure 5) mounted on an insulated bobbin 131. Such coil 130 is enclosed by structure of magnetizable material comprising the annular core 41, the end plate or ring 132 and the L-shaped annular member 133 which is slotted to provide a plurality of pole pieces. The members 132 and 133 are recessed within the core 41 in a unitary structure. The member 133 is slotted as shown in Figure 19 to provide sixteen pole pieces 133A. Three copper apertured shading rings 140, 141 and 142 are on the slotted portions of the member 133 with the aperture portions in the copper rings encircling alternate ones of such pole pieces 133A. These copper rings are securely mounted on such pole pieces by press fitting, cementing or by other well-known expedients. A spacer ring 144 is interposed between the copper ring 140 and the radial extending portion of the member 133. These pole pieces 133A produce a magnetic flux which interacts with the magnetizable armature ring 145 which is supported by the perforated cup-shaped aluminum disk 146, such disk 146 being secured to the armature shaft 38. It is noted with respect to Figure 21 that the end plate 132 is of special construction involving eight outwardly extending portions 132A which are notched to engage the same pole pieces 133A which are embraced by the apertured portion of the copper rings 140, 141 and 142.

Preferably the mounting plate 31 (Figure 5) is covered by a more or less decorative plate 150 which is secured to the same by means of screws, the plate 150, however, being apertured to allow access to the operating member of the toggle switch 21, the dial 11 and levers 13 and 14 and lever 23.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:

1. An electrical control system comprising an electrical clock mechanism, a calibrated dial face for said clock mechanism having a serrated edge, means including said clock mechanism for rotating said dial face, a first switch arm, means mounting said first switch arm at one end for rotation on the same axis as but independently of said dial face, means at the other end of said switch arm to removably engage said dial serrations, pin means mounted on said first switch arm, a second switch arm, means mounting said second switch arm at one end for rotation on the same axis as but independently of said dial face, means at the other end of said switch arm to removably engage said dial serrations, pin means mounted on said second switch arm, snap acting switch means including a rotatable actuating member therefor positioned for operation by said first pin means at a first predetermined position and to be operated by said second pin means at a second predetermined position, means for applying operating potential to said clock mechanism and to said switch means, and manually operated snap acting switch means to shunt said switch means.

2. A mounting plate adapted to be mounted on an outlet box and having mounted thereon an electrical clock mechanism, a first snap acting switch, adjustable means operated by said clock mechanism to operate said switch, a second manually operated snap acting switch connected in shunt with said first switch, and electrical means connected in series with said switches.

3. Apparatus as recited in claim 2 wherein said electrical means is a third manual snap acting switch, all mounted on said mounting plate.

4. A mounting plate as recited in claim 2 wherein said clock mechanism includes a shaft extending through said plate and driven by said clock mechanism at one revolution for twenty-four hours, and a calibrated dial having a serrated periphery mounted on said shaft to be rotated therewith; and said means operated by said clock mechanism includes said first switch mounted on said plate, a first switch arm having one end rotatably mounted on said shaft, means at the other end of said first switch arm to removably engage said dial serrations, pin means positioned on said first switch arm to actuate said first switch to one of its positions, a second switch arm having one end rotatably mounted on said shaft, means at the other end of said second switch arm to removably engage said dial serrations, and pin means positioned on said second switch arm to actuate said first switch to the other of its two positions when moved over said switch with said dial.

5. In a unit of the character described, a dial switch actuating member adjustably mounted on said dial, a support rotatably mounting said dial, an on-off switch mounted on said support, said switch having a binding post, a metallic switch supporting frame, means insulatedly mounting said frame on said support, switching means metallically connected to said frame and operated by said switch actuating members, a metallic strap connected to said binding post and having a clip formed thereon, said metallic frame having an extending portion engageable with said clip.

6. An arrangement as set forth in claim 5 in which said switching means includes means for producing a snap action of the same.

7. A unit of the character described comprising a mounting plate, bushing means mounted on said plate, a spindle rotatable in said bushing means, said spindle having a flange, a dial rotatably mounted on said spindle, a friction washer mounted on said spindle, said spindle having a grooved portion, a snap ring in said grooved portion and maintaining said dial and said washer on said spindle with said washer bearing on said flange, said dial having a hub portion, a pair of manually operable switch actuating arms rotatably mounted on said hub portion, common switch means actuated by each of said arms, a third manually operable switch actuating arm pivoted on said bushing means, second switching means operated by said third arm, said second switching means being connected in parallel with said common switching means.

References Cited in the file of this patent

UNITED STATES PATENTS

| | | |
|---|---|---|
| 951,750 | Stuparich | Mar. 8, 1910 |
| 1,533,677 | Warren | Apr. 14, 1925 |
| 1,944,055 | Arden | Jan. 16, 1934 |
| 1,952,893 | Reppert | Mar. 27, 1934 |
| 2,323,411 | Newman | July 6, 1943 |
| 2,379,273 | Bluemink et al. | June 26, 1945 |
| 2,388,863 | Noble | Nov. 13, 1945 |
| 2,474,494 | Platt | June 28, 1949 |
| 2,488,110 | Aitken | Nov. 15, 1949 |
| 2,535,001 | Truesdell | Dec. 19, 1950 |
| 2,608,082 | Jones | Aug. 26, 1952 |
| 2,644,047 | Leonard | June 30, 1953 |
| 2,677,732 | Miller | May 4, 1954 |
| 2,700,077 | Morrison | Jan. 18, 1955 |